United States Patent [19]

Wessling

[11] 4,020,088
[45] Apr. 26, 1977

[54] CONDITIONING OF PERHALOGENO-COPPER PHTHALOCYANINES
[75] Inventor: Diether Wessling, Cologne, Germany
[73] Assignee: Bayer Aktiengesellschaft, Leverkusen, Germany
[22] Filed: Oct. 14, 1975
[21] Appl. No.: 621,798
[30] Foreign Application Priority Data
Oct. 16, 1974 Germany ............................ 2449148
[52] U.S. Cl. ............................................ 260/314.5
[51] Int. Cl.$^2$ ........................................ C09B 47/04
[58] Field of Search ................................ 260/314.5
[56] References Cited
UNITED STATES PATENTS

| | | | |
|---|---|---|---|
| 2,662,085 | 12/1953 | Holtzman et al. | 260/314.5 |
| 2,833,782 | 5/1958 | Stryker et al. | 260/314.5 |
| 2,833,784 | 5/1958 | Ehrich | 260/314.5 |
| 2,873,279 | 2/1959 | Randall et al. | 260/314.5 |
| 3,041,192 | 6/1962 | Brouillard et al. | 260/314.5 |
| 3,293,262 | 12/1966 | Pugin | 260/314.5 |
| 3,353,977 | 11/1967 | Kranz et al. | 260/314.5 |
| 3,424,759 | 1/1969 | Stewart | 260/314.5 |

*Primary Examiner*—John D. Randolph
*Attorney, Agent, or Firm*—Plumley and Tyner

[57] ABSTRACT

Perhalogeno-copper phthalocyanine granular pigments are obtained in that a perhalogeno-copper phthalocyanine crude pigment is introduced into an aromatic solvent in which is suspended a long-chain alcohol-sulphate, the mixture is heated to 100° – 150° C under pressure, the granules are filtered off and the solvent is either washed out or distilled off in steam.

2 Claims, No Drawings

CONDITIONING OF PERHALOGENO-COPPER PHTHALOCYANINES

The subject of the invention is a process for the preparation of perhalogeno-copper phthalocyanine pigments in granular form.

The term perhalogeno-copper phthalocyanines is applied to copper phthalocyanines which are halogenated to close onto the theoretical halogen content of 16 halogen atoms per molecule. The halogen content of commercially available perhalogeno-copper phthalocyanines is on average between about 13.5 and 15.5 halogen atoms per mol. Suitable halogen atoms are chlorine and bromine, chlorine being particularly preferred. Perhalogeno-copper phthalocyanines are usually prepared in inorganic melts, for example aluminium chloride/sodium chloride melts, aluminium chloride/sulphuryl chloride melts or mixtures of aluminum chloride, sulphuryl chloride and sodium chloride, by passing halogens, for example chlorine or bromine, into the melt. The process according to the invention starts from the halogenation melts.

It is already known from German Auslegeschrift (German Published Specification) 1,114,462 that granular perchlorocopper phthalocyanine pigment particles are obtained if a crude perchloro-copper phthalocyanine pigment is vigorously stirred into water until a smooth paste is obtained and o-dichlorobenzene is then added dropwise. The granular filter cake obtained after filtration is then introduced into a distillation apparatus which contains about a 10-fold amount of water, together with small amounts of secondary sodium phosphate and spermaceti oil. However, in the course of the subsequent steam distillation, during which the o-dichlorobenzene is distilled off, the granular structure of the pigment is destroyed and on subsequent isolation it is only a perchloro-copper phthalocyanine pigment powder which can be obtained.

It has now been found, surprisingly, that a perhalogeno-copper phthalocyanine pigment which even after final isolation and drying is in a free-flfowing granular form with little dust, can be obtained if a perhalogeno-copper phthalocyanine crude pigment, obtained if a perhalogeno-copper phthalocyanine crude pigment, obtained as a filter residue and preferably having a solids content of about 30 to 45%, is introduced into an aromatic solvent in which is suspended a long-chain alcohol-sulphate, thereby giving a granular pigment, this granular pigment, which has adsorbed almost all the aromatic solvent and is present in the aqueous phase, is heated under pressure to 100°–150° C, preferably 4 to 6 hours to 110°–139° C, during which the granular form is retained, the granules are filtered off and the solvent is either washed out of the granules with water or methanol or, more advantageously, is distilled off by means of steam. The pressure can amount up to 10 atmospheres excess pressure.

The free-flowing granular pigment with little dust, obtained in accordance with this process can be used directly, without additional comminution (grinding) for a great variety of pigmentation purposes, without losses of tinctorial strength and brilliance.

Suitable long-chain alcohol-sulphates are those derived from saturated and unsaturated fatty alcohols with 8 to 18 C atoms, preferably 12 to 14 C atoms, for example lauryl sulphate, oleyl sulphate and coconut fatty alcohol-sulphate.

The long-chain alcohol-sulphate, which can also be in the form of mixtures, are suitably employed in amounts of 0.1 – 10 percent by weight, preferably 0.2 – 1 percent by weight, relative to dry pigment.

Suitable aromatic solvents are liquid benzene derivatives which can contain lower alkyl groups, halogen atoms or nitro groups as substituents, for example benzene, toluene, xylene, monochlorobenzene, dichlorobenzene and trichlorobenzene and nitrobenzene. The aromatic solvents are employed in amounts of 50 – 150 percent by weight, preferably 50 – 80 percent by weight, relative to dry pigment.

Example 1

36.0 kg of sulphuryl chloride, 40 kg of anhydrous aluminium chloride and 5 kg of anhydrous sodium chloride are introduced into a reaction vessel equipped with a reflux condenser.

16.0 kg of copper phthalocyanine are introduced at 50° – 60° C and the mixture is heated to 120° – 130° C. At about 100° C, the introduction of 25 – 28 kg of chlorine is started, and this is continued at 120° – 130° C until the chlorine content of the pigment is about 49%. The melt is poured into 200 kg of water and air is passed through the mixture for 1 hour.

The product is filtered off hot and washed with hot water until free from salt.

The filter cake, having a solids content of about 34%, is introduced, while stirring, into a suspension, warmed to 50° – 60° C, of 16.2 kg of chlorobenzene and 80 g of coconut fatty alcohol-sulphate (Na salt), the pH value of the granular suspension which forms is adjusted to 8 – 9 with sodium carbonate, and the suspension is heated to 120° C under pressure and kept at this temperature for 5 hours.

It is then cooled to 90° – 95° C, the pigment/solvent granules, which are 0.5 – 2 mm, preferably 1 mm, in size, are filtered off and the chlorobenzene is expelled from the filtration apparatus by means of steam, in the course of which the granular form is retained.

For many pigment preparations, the water-moist granular filter cake can be employed directly; preferably, the product is dried, giving a free-flowing granular pigment with little dust, which gives brilliant, deeply coloured bluish-tinged green dyeings.

Example 2

35 kg of sulphuryl chloride, 40 kg of anhydrous aluminium chloride and 15.7 kg of bromine are introduced into a reaction vessel equipped with a reflux condenser.

11.0 kg of copper phthalocyanine are introduced at 40° – 45° C and the mixture is heated to 120° C, with simultaneous addition of a further 9.5 kg of bromine and, if necessary, with replenishment of sulphuryl chloride, and is kept at this temperature for 1 hour.

The melt is poured out onto 220 kg of water, and air is passed through the mixture for 1 hour.

The product is filtered off hot and washed with hot water until free from salt.

The filter cake, having a solids content of 37%, is introduced, while stirring, into a suspension, warmed to 60° – 70° C, of 15 kg of o-dichlorobenzene and 70 g of coconut fatty alcohol-sulphate (Na-salt), the pH value of the granular suspension is adjusted to 7 – 8 with sodium carbonate and the suspension is heated to 130° C under pressure and kept at this temperature for 6 hours. After working up analogously to Example 1, a strongly yellowish-tinged green pigment product having a particle diameter of about 1 mm is obtained.

EXAMPLE 3

A mixture of 20 kg of anhydrous aluminium chloride, 4 kg of sodium chloride and 1.2 kg of anhydrous copper-(II) chloride is fused in a reaction vessel at 140° C.

The introduction of about 15 kg of chlorine is started slowly and at 160° C 5.0 kg of copper phthalocyanine are introduced whilst raising the temperature to 180° – 200° C, and chlorination is carried out at this temperature until the chlorine content is about 49 percent by weight.

The melt is poured into 250 l of water and the pigment is filtered off hot and washed with hot water until free from salt.

The filter cake, having a solids content of 40%, is introduced, while stirring, into a suspension, at 60° – 70° C, of 6 kg of nitrobenzene and 30 g of lauryl sulphate (Na salt), and thereafter the procedure followed is analogous to Example 1.

I claim:
1. Process for the preparation of a perhalogenocopper phthalocyanine pigment in granular form, characterised in that a perhalogeno-copper phthalocyanine crude pigment having a solids content of about 30 to 45% is introduced into 50 to 150% by weight relative to dry pigment of an aromatic solvent in which is suspended 0.1 to 10% by weight relative to dry pigment of a long-chain alcohol-sulphate, the mixture is heated to 100° to 150° C under pressure, the granules are filtered off and the solvent is washed out or distilled off in steam.

2. Process according to claim 1, characterised in that chlorobenzene, o-dichlorobenzene or nitrobenzene is used as the solvent.

* * * * *